United States Patent [19]

Baker et al.

[11] Patent Number: 5,627,748
[45] Date of Patent: May 6, 1997

[54] METHOD OF IDENTIFYING PATTERN MATCHES IN PARAMETERIZED STRINGS AND SQUARE MATRICES

[75] Inventors: Brenda S. Baker, Berkeley Heights, N.J.; Raffaele Giancarlo, New York, N.Y.

[73] Assignee: Lucent Technologies Inc., Murray Hill, N.J.

[21] Appl. No.: 61,782

[22] Filed: May 14, 1993

Related U.S. Application Data

[63] Continuation-in-part of Ser. No. 853,459, Mar. 18, 1992.
[51] Int. Cl.$^6$ .............................. G06F 17/21; G06F 17/40
[52] U.S. Cl. ..................... 395/792; 395/709; 395/793; 395/606
[58] Field of Search ................... 364/419.1, 419.08, 364/419.19, 715.1, 419.13; 341/51, 65, 67; 395/600, 700

[56] References Cited

U.S. PATENT DOCUMENTS

| | | | |
|---|---|---|---|
| 4,464,650 | 8/1984 | Eastman et al. | 341/51 |
| 4,864,528 | 9/1989 | Nishiyama et al. | 364/754 |
| 5,058,144 | 10/1991 | Fiala et al. | 375/122 |
| 5,151,697 | 9/1992 | Bunton | 341/51 |
| 5,270,712 | 12/1993 | Iyer et al. | 341/50 |
| 5,276,741 | 1/1994 | Aragon | 382/40 |
| 5,323,316 | 6/1994 | Kadashevich et al. | 364/419.01 |
| 5,355,473 | 10/1994 | Au | 395/600 |
| 5,369,577 | 11/1994 | Kadashevich et al. | 364/419.13 |
| 5,406,279 | 4/1995 | Anderson et al. | 341/51 |
| 5,412,807 | 5/1995 | Moreland | 395/600 |
| 5,414,425 | 5/1995 | Whiting et al. | 341/67 |

OTHER PUBLICATIONS

E. M. McCreight, "A Space–Economical Suffix Tree Construction Algorithm", Journal of the Association for Computing Machinery, vol. 23, No. 2, Apr. 1976, pp. 262–272.

R. Giancarlo, "The Suffix of a Square Matrix, with Applications", Proceedings of the Fourth Annual ACM–SIAM Symposium on Discrete Algorithms, Austin, Texas, 1993.

Aho et al., Compilers; Principles, Techniques, and Tools, Addison Wesley Publishing Co., 1986, pp. 83–88.

Blumer (Dialog Accession No. 03141370); abstract of Journal Paper Published Dec. 1987 in *Journal of Algorithms*, vol. 8, No. 4, pp. 451–469.

*Primary Examiner*—Robert A. Weinhardt
*Assistant Examiner*—Joseph Thomas
*Attorney, Agent, or Firm*—Geoffrey D. Green; Michele L. Conover

[57] ABSTRACT

Methods are disclosed for finding maximal matches in data strings and for finding matches in parameterized strings, that is, strings containing symbols from more than one alphabet in which the symbols from one of the alphabet are treated as parameters. In general, such maximal matches are found by creating a suffix tree representing the data string, generating lists for each node in the tree indicating the left contexts of all suffixes associated with that node and reporting matches for pairs of suffixes having different left contexts. One method of finding parameterized matches is to substitute a common symbol for the symbols of the alphabet representing the parameters before creating the suffix tree and then discarding matches found for which the actual parameters are not consistent. Another, preferred, method of finding parameterized matches is to substitute integers for the symbols of the alphabet representing the parameters, such symbols being chosen to create a linked list in the data string for each different symbol in such alphabet. Matches found by the suffix tree are then consistent and no matches need be discarded. Other methods of finding matches are disclosed in which suffix trees are used in conjunction with square matrices to analyze the data strings.

8 Claims, 11 Drawing Sheets

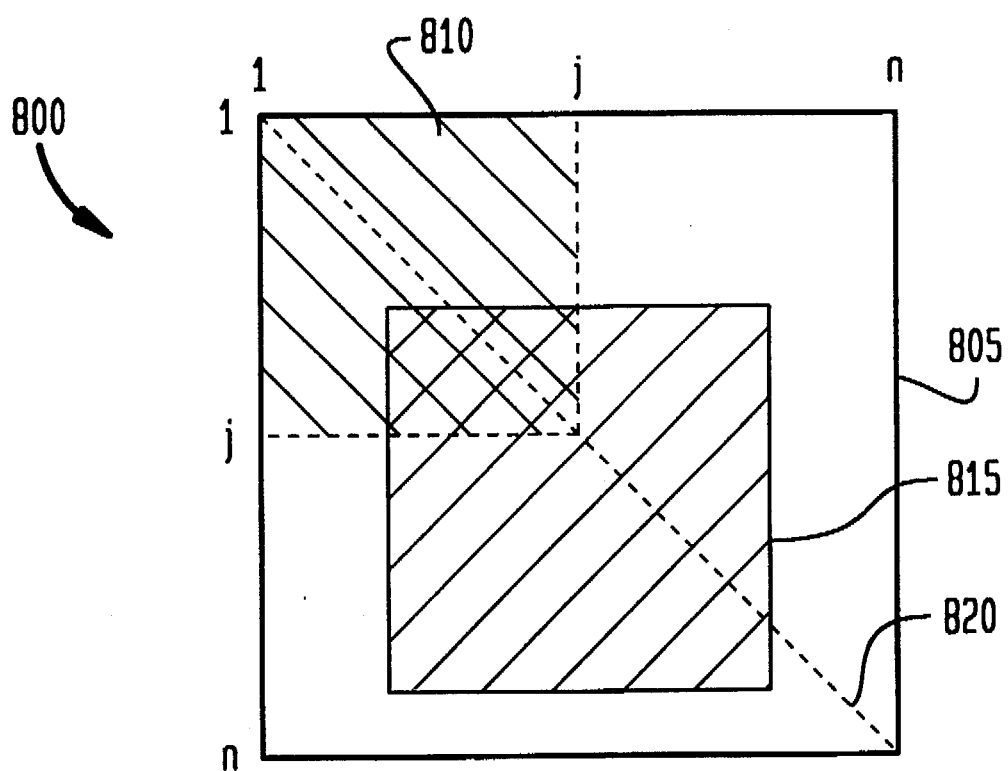

METHOD OF IDENTIFYING PATTERN MATCHES IN PARAMETERIZED STRINGS AND SQUARE MATRICES

This is a continuation-in-part of U.S. patent application Ser. No. 07/853,459, entitled "Method and Apparatus for Studying Very Large Sets of Data", filed Mar. 18, 1992, currently pending.

BACKGROUND OF THE INVENTION

The present invention relates to a method of identifying pattern matches and duplication in coded structures and square matrices and, more particularly, to a method of identifying pattern matches in coded structures and square matrices via encodings as special kinds of strings, namely parameterized strings and linear strings respectively.

In a large ongoing systems project, introduction of new features and code maintenance by large staffs of programmers may result in code that includes many duplicated sections. Such duplication occurs even though it is known that copying code may make the code larger, more complex and more difficult to maintain. Many times when a revision is made to a large software system, the programmer copies and modifies old code while still maintaining the old code in the system. The copies may be further copied and modified as the system is revised. In time, the amount of duplication in the system can become substantial and significantly complicate maintenance.

Various methods are known for finding duplication in symbol strings. One such method is calculating a matrix A such that A[i,j] is 1 if symbol i matches symbol j and 0 otherwise, followed by searching the diagonals of the matrix for maximal matches. However, this method takes quadratic time and quadratic space with respect to the length of the string. For large strings, such as computer programs containing millions of lines of code, such a method is impractical. Another method that can be used for such large strings makes use of data structure models known as suffix trees, for example as described in E. McCreight, "A Space-Economical Suffix Tree Construction Algorithm", Vol. 23, No. 2, Journal of A.C.M., 262–272 (April 1976). Such suffix trees can be used for finding code duplications in large computer programs.

Many times the ongoing revisions of the code result in sections of code that are not identical, but are similar in content except for a systematic change in parameter names, such as identifiers and constants. For example, in one section of the code the parameters first, last, 0 and fin may be used and in another section of the code these parameters may be replaced by init, final, 1 and g. The correspondence between sections of code which are similar except for labeling of parameters is referred to as a parameterized match. These "parameterized" matches cannot be found using the methods described above.

Clearly, the amount of code can be reduced if sections of code that are identical except for the labeling of parameters are replaced by a single subroutine. Thus it is desirable to find parameterized matches in bodies of code in which sections of code are identical except for parameters. Further it is deskable to be able to find parameterized matches using suffix trees. By identifying parameterized matches in a text of code, problems such as inconsistent code and plagiarism of code can be detected.

A problem also exists in designing a data structure model which efficiently represents a two-dimensional analog of a suffix tree for square text matrices. Such an application is useful in low-level image processing, and in conjunction with visual databases for use in multimedia systems. The suffix tree must represent all substrings of the text in an index which can be directly queried and which is efficient in both its representation and storage requirements.

There is a need for a method of identifying pattern matches in parameterized strings and square matrices which is more efficient in both time and space. In addition, the method should be capable of identifying only those pattern matches which are over a threshold length thereby maximizing the information content of the match reported. There is also a need for being able to provide a linear representation of a square matrix for addressing problems which arise in low-level image processing and visual databases.

SUMMARY OF THE INVENTION

The present invention is directed to methods of finding maximal matches in data strings and for finding matches in parameterized strings, that is, strings containing symbols from more than one alphabet in which the symbols from one of the alphabets are treated as parameters.

In accordance with one aspect of the invention, maximal matches are found by creating a suffix tree representing the data string, generating lists for each node in the tree indicating the left contexts of all suffixes associated with that node and reporting matches for pairs of suffixes having different left contexts.

In accordance with another aspect of the invention, parameterized matches are found by substituting a common symbol for the symbols of the alphabet representing the parameters before creating the suffix tree and then discarding matches found for which the actual parameters are not consistent.

In accordance with still another aspect of the invention, which is a preferred embodiment, integers are substituted for the symbols of the alphabet representing the parameters, such symbols being chosen to create a linked list in the data string for each different symbol in such alphabet. Matches found by the suffix tree are then consistent and no matches need be discarded.

Another aspect of the invention uses suffix trees in conjunction with square matrices to analyze data strings.

These and other aspects of the invention will become apparent from the drawings and detailed description.

BRIEF DESCRIPTION OF THE DRAWING

FIG. 8 illustrates a n×n matrix A in accordance with the present invention.

FIG. 12 illustrates an L-suffix tree of the matrix illustrated in FIG. 9a.

DETAILED DESCRIPTION

The present invention is directed to a method of identifying duplication in strings, such as coded structures. More particularly, the present invention is directed to identifying maximal matches in a string. Maximal matches are pairs of substrings which cannot be extended either to the left or to the right and which are preferably of at least a threshold length. Many times, however, the matches are parameterized matches in which each of a pair of substrings contains the same pattern of symbols except that certain symbols in one of the substrings are labeled differently, but are in the same position as other symbols within the second substring. In order to provide consistency and to avoid unnecessary duplication, it is necessary to be able to identify these parameterized matches.

FINDING MAXIMAL MATCHES IN A STRING

An efficient way to represent a data string S is by a suffix tree, which represents all of the suffixes of the string. A suffix of a string is a substring beginning at some position i in the string and continuing on to the end. In the preferred embodiment, the data string includes a unique endmarker ($), which does not occur elsewhere in S. In such a tree, arcs extend from a root through internal nodes to leaf nodes. Nodes which depend from a node are referred to as children. Each arc represents a portion of the string. At the root and each node, the label for each arc begins with a different symbol. Each leaf represents a suffix, which can be read by concatenating the labels along the path from the root to the leaf.

Figure 1:
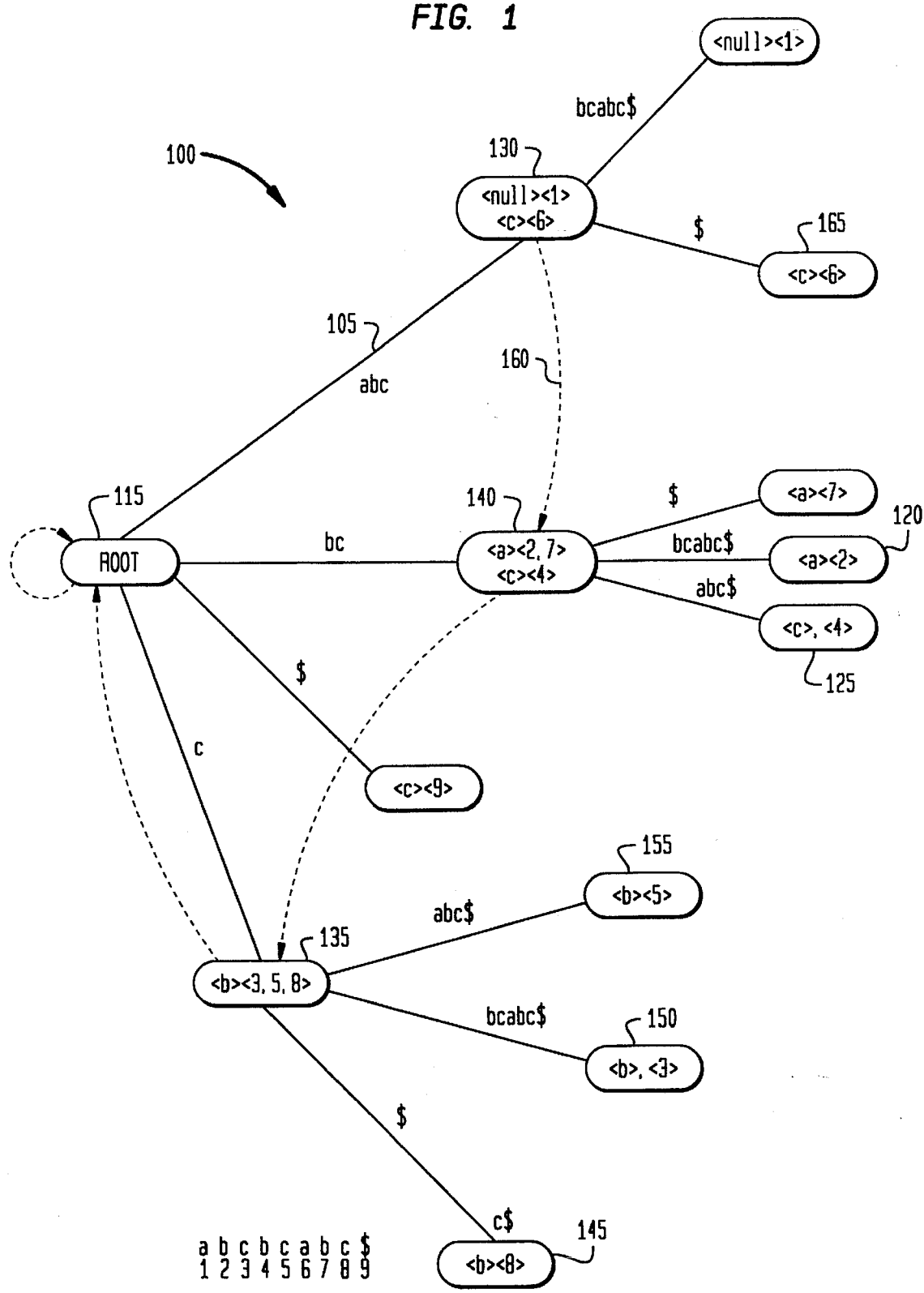
FIG. 1 illustrates a suffix tree for data string S.

FIG. 1 illustrates an example of a suffix tree 100 for a regular string S=abcbcabc$. In order to construct the tree, each suffix i of the string S must be identified. The suffixes of S are: abcbcabc$, bcbcabc$, cbcabc$, bcabc$, cabc$, abc$, bc$, c$, and $.

CONSTRUCTING A SUFFIX TREE

A suffix tree for a string can be represented by storing the string itself, along with information for each node in the tree. Such information can include items such as an identification of the node's parent, a pointer to the position in the string of the beginning of the arc leading to the node, the length of such arc, the pathlength from the root to the node and a suffix link. Suffix links are pointers to other nodes, which, as described by McCreight, speed up the creation of suffix trees by eliminating the need to return to the root each time a new suffix is added to the tree. Suffix links also aid in searches through trees. In general, the suffix link for a node having pathstring (Si . . . Sj) points to the node having pathstring (Si+1 . . . Sj). In FIG. 1, suffix links are indicated by dotted arrows. For example, as indicated by dotted arrow 160 in FIG. 1, the suffix link for node 130, whose pathstring is "abc," points to node 140, whose pathstring is "bc."

It is not always possible to determine the suffix link for a node when the node is created because the destination node for the suffix link may not have been created yet. For example, node 140 is created (by addition of leaf node 125) before node 135 (by addition of leaf node 155). However, node 140 exists when node 130 is created (by addition of leaf node 165). When a node is created, its identity typically becomes the suffix link for the previous node created.

Figure 2:
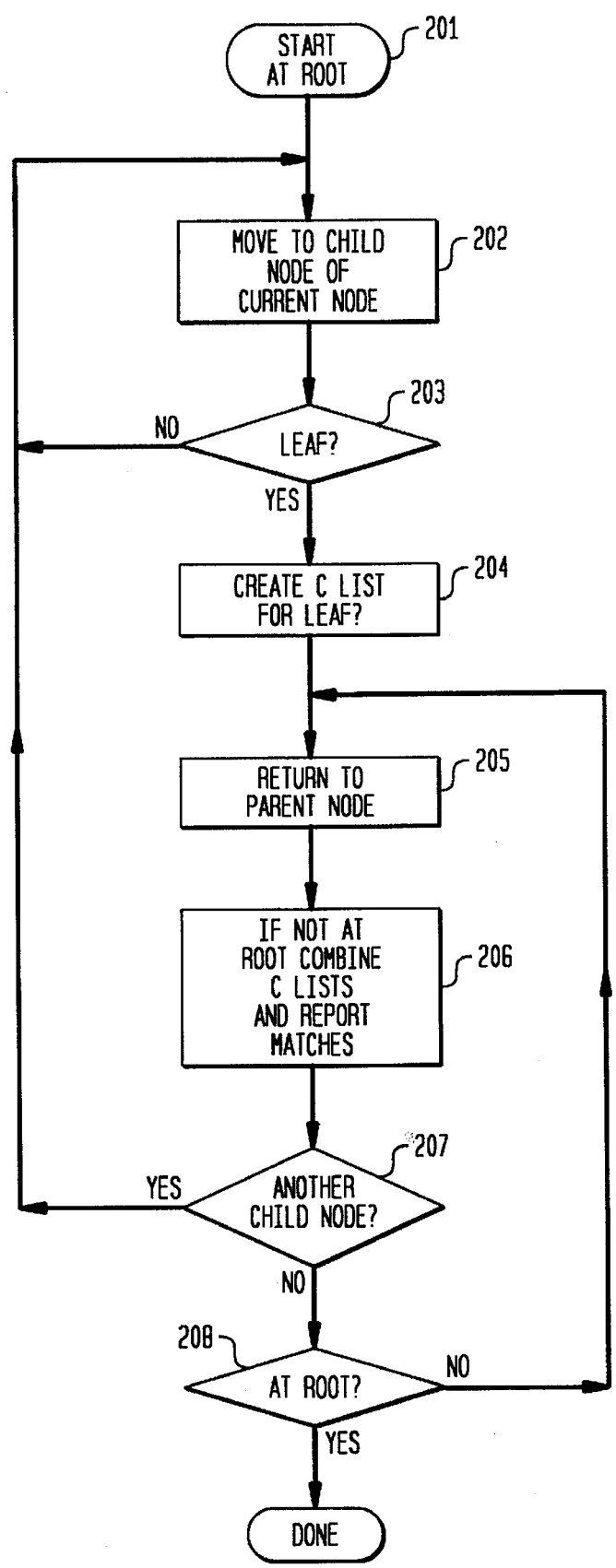
FIG. 2 illustrates a flow chart depicting a method of identifying maximal matches.

FIG. 2 is a flow chart showing the steps in identifying maximal parameter matches in a string for which a suffix tree has been created. As will be described, a data structure called a plist is constructed for each node in the suffix tree. For each leaf node, the plist is a pair of the form:

<left context><position> where <position> is the position in the string where the substring represented by the leaf node begins and <left context> is the symbol just to the left of such position. For example, in FIG. 1, the plist for leaf node 120 has left context "a" and position "2" and the plist for leaf node 125 has left context "c" and position "4".

The clist for each internal node is one or more plists of the form:

<left context><set of positions> which combines the plists from all children of such node. In performing such combination, it is convenient to compress the data structure by combining plists having the same left context. The plists for internal node 130 cannot be so compressed because the left context for both children are different. In contrast, the plists for node 135 can be compressed into a single entry because the left context for the children of node 135 are all the same. The clist for node 140 requires two entries for two different left contexts "a" and "c".

Node 130 is at a length of 3 symbols from the root, and the fact that such node has two children indicates a match of two substrings of at least that length. Since there is more than one plist in the clist for such node, such match is maximal length. As can be seen from string S, the symbols "abc" are repeated. However, in the clist for node 135, all entries have the same left context, so there are no maximal matches indicated.

As a slightly more complicated example, consider a tree (not shown) having a node at length 10 from the root with the following clist:

<a><10,70>

<b><30,50>

This clist indicates four maximal matches of length 10, that is, the substring beginning at position 10 matches substrings beginning at positions 30 and 50 and the substring beginning at position 70 also matches substrings beginning at positions 30 and 50. The strings beginning at positions 10 and 70 also match each other, but the match is not maximal because such strings have the same left context "a". Similarly, the match of the string beginning at positions 30 and 50 is not maximal.

Maximal matches can thus be determined from clists. Clists can be created by the process shown in FIG. 2. In general, the process recursively finds the plist for each leaf node and then the combined clists for each internal node. Maximal matches having a length over a preset threshold are determined from the clists.

The process shown in FIG. 2 begins at the root node (step 201), and moves to a child node of that node (step 202). If such child node is not a leaf node (step 203), the process repeats step 202 until a leaf node is reached. Then a plist having a left context and a position is determined for such leaf node. For example, referring back to FIG. 1, beginning at root node 115, the process might first move to internal node 135 and then to leaf node 145 to calculate the plist for leaf node 145.

After the plist for the leaf node is determined, the process returns to the parent node(step 205), combines the plist just created with other plists created for such node, and reports any maximal matches found (step 206). Of course, on the first return to such parent node, only one plist will have been created, so no combination is possible and no matches will be found. If another child node exists leading from such parent node, the process repeats steps 202, 203, 204, 205 and 206 for each additional child node. Again referring to FIG. 1, the process creates the plist for leaf node 150, combines that plist with that created for node 145, then creates the plist for leaf node 155 and combines that plist with the previous combination. However, since the resulting clist for internal node 135 has only one entry, no match is indicated.

If there is no other child node (step 207) and the node being addressed is not the root (step 208), then the process returns to step 205 to address the next parent node in the path to the root. If the new parent node is not the root, step 206 is performed for the new parent node to combine clists and detect matches. However, for tree 100 in FIG. 1, such return from internal node 135 is to root 115, so the plists are not combined.

In general, the process repeats the above steps until all nodes in the entire tree have been traversed and clists for all leaves have been created and combined for each internal node. When a clist contains more than one entry, maximal matches are reported if the matches exceed the minimum length desired. For example, for tree 100 in FIG. 1, the clist for internal node 140 indicates maximal matches for 2-symbol substring "bc" at positions 2 and 7 with the substring at position 4 and the clist for internal node 130 indicates a maximal match for 3-symbol substring "abc" at the beginning of the string and at position 6. If the minimum length desired is 3 symbols, then the match indicated by the clist for node 130 would be reported but the matches indicated by the clist for node 140 would not.

PARAMETERIZED STRINGS (P-STRINGS)

A parameterized string (p-string) S comprises a plurality of symbols, at least one of which is a parameter. An example of a pair of p-strings $S_1$ and $S_2$ are as follows:

$S_1$=axaybxycby      (1)

$S_2$=ayavbyvcbv      (2)

Each p-string $S_1$, $S_2$ contains a plurality of symbols from a first alphabet ($\Sigma$) and a second alphabet ($\Pi$) both of which are preferably finite. The symbols in the first alphabet can be ordinary or non-parameter symbols and the symbols in the second alphabet can be parameter symbols. The p-strings can comprise symbols from any number of types of alphabets. In the present example, $\Sigma\{a,b,c\}$ and $\Pi=\{x,y,v\}$.

A parameterized match (p-match) exists between two strings if one p-string can be transformed into the other p-string by consistently renaming the parameters from one p-string to the other. In determining whether two p-strings are a p-match, each of the p-strings is scanned from left to right. At the same time, a table is constructed which provides a one-to one correspondence between symbols in each string to determine if any mismatches are found between the symbols.

For example, below p-strings $S_1$ and $S_2$ are shown in a table format which illustrates the one-to-one relationship between symbols of corresponding position in each p-string.

| # | $S_1$ | $S_2$ |
|---|---|---|
| 0 | a | a |
| 1 | x | y |
| 2 | a | a |
| 3 | y | v |
| 4 | b | b |
| 5 | x | y |
| 6 | y | v |
| 7 | c | c |
| 8 | b | b |
| 9 | y | v |

The first column of the table indicates the position from left to right of each symbol in the string, starting with symbol 0. The second and third columns list the symbols in p-string $S_1$ and p-string $S_2$. As can be seen, symbols from alphabet $\Sigma$ in the first p-string $S_1$ are in the same position and are of the same type as those corresponding $\Sigma$ symbols in p-string $S_2$. More explicitly, symbol a in p-strings $S_1$ and $S_2$ occurs at positions 0 and 2, symbol b in p-strings $S_1$ and $S_2$ occurs at positions 4 and 8 and symbol c occurs at position 7.

With respect to the parameter symbols from alphabet $\Sigma$, symbol x in p-string $S_1$ and symbol y in p-string $S_2$ occur at the same positions, i.e., positions 1 and 5, and symbol y in p-string $S_1$ and symbol v in p-string $S_2$ occur at the same positions, i.e., 3, 6 and 9. Essentially, symbols x and y in p-string $S_1$ have been renamed y and v in p-string $S_2$. Therefore, since all like symbols from the first alphabet in p-strings $S_1$ and $S_2$ are in the same positions, and all like symbols from the second alphabet are in the same corresponding positions as like symbols in p-string $S_2$ which are different from the like symbols in p-string $S_1$, a parameterized match exists between p-strings $S_1$ and $S_2$. By examining the p-strings in a table format, not only can mismatches in length be detected, but also mismatches between different non-parameters, differences between a parameter and a non-parameter, or between two parameters where at least one of the parameters has already been made to correspond to a different parameter. The detection of mismatches in this manner can be done in time linear with respect to the strings being matched.

FINDING MAXIMAL MATCHES IN PARAMETER STRINGS

Figure 3:
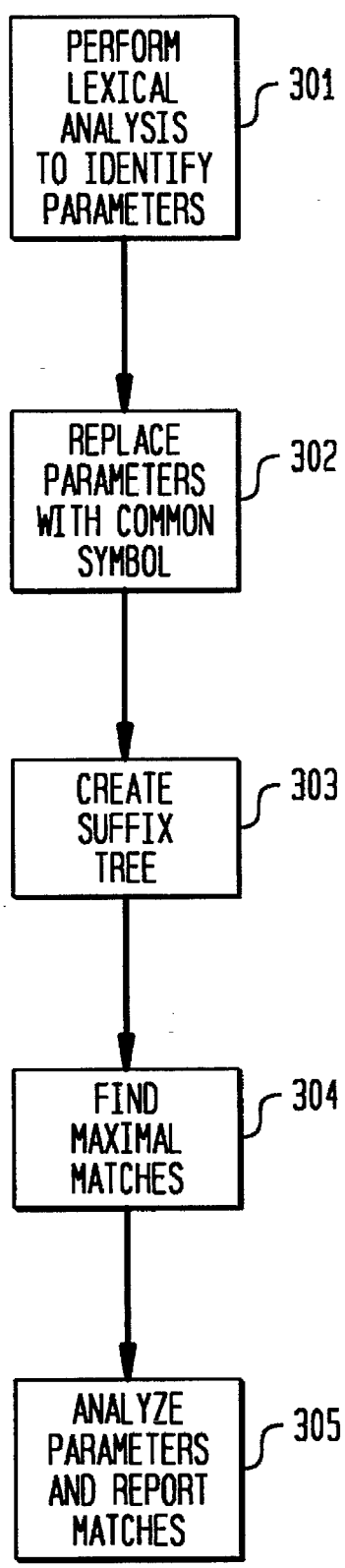
FIG. 3 illustrates a flow chart depicting a method of identifying maximal parameter matches.

Because of the complexity of identifying repetitions of different parameters within a string, parameters can be labeled by the same identifier so that the parameterized string is simplified. FIG. 3 is a flow chart representing one method of identifying maximal parameterized matches.

A data string, such as computer code, including parameters is first subjected to a lexical analysis in which parameters are identified (step 301) and encoded by replacing each parameter with a common symbol (step 302). Techniques for performing the lexical analysis are disclosed in A. V. Aho, et. al., Compilers: Principles, Techniques and Tools, Addison-Wesley, Reading Mass., 1986.

For example, lexical analyses of a parameterized string x=fun(y)+3*x and replacement of each parameter with the symbol "p" generates the following output: p=p(p)+p*p and a parameter list x, fun, y, 3, x. String axaybxycby using alphabets $\Sigma$ and $\Pi$ yields apapbppcbp and parameter list x,y,x,y,y. A matching step can then match strings with the same numbers and positions of symbols.

Next, a suffix tree is created (step 303) and a sequence matching process is performed in the same manner as described above to find all maximal parameterized matches (step 304) in the text that are at least as long as a predetermined threshold length. Then the actual parameters for each match are analyzed (step 305) to determine if an appropriate one-to-one correspondence can be made. The matches for which such correspondence exists and all other matches are discarded.

Figure 4:
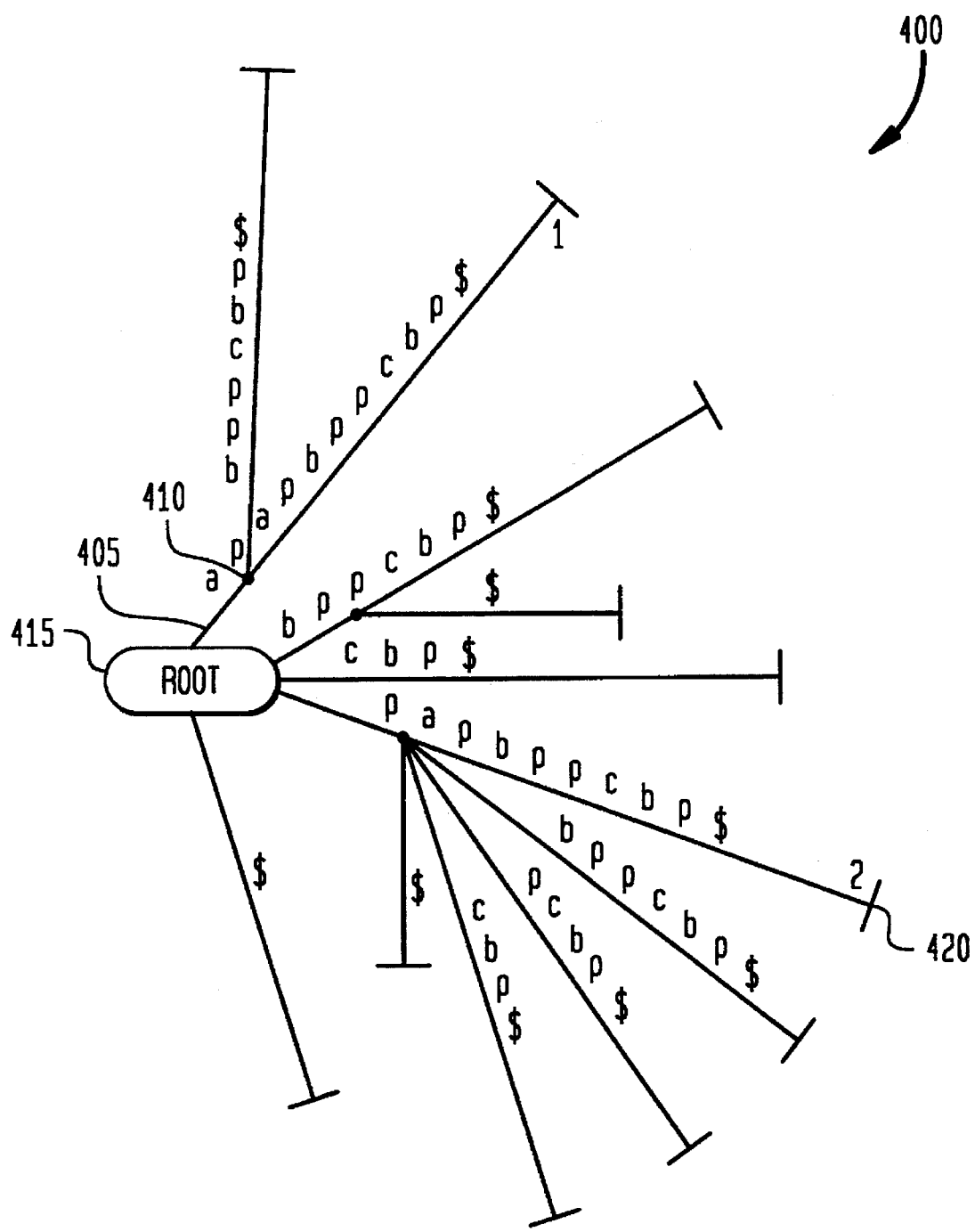
FIG. 4 illustrates a suffix tree for an encoded string S(P).

Suffix tree 400 for the encoded version of a string is illustrated in FIG. 4. If either string $S_1$ or $S_2$ is encoded as described above, the following string results:

$$S(p)=apapbppcbp\$ \qquad (3)$$

The suffixes of S(p) are as follows: apapbppcbp$, papbppcbp$, apbppcbp$, pbppcbp$, bppcbp$, ppcbp$, pcbp$, cbp$, bp$, p$ and $. Each arc of suffix tree represents a substring of the input string S(p).

Once the suffix tree is constructed, it can be used to identify parameterized matches in the string, as described above.

When a match is found between two substrings in a parameterized string, the actual parameters in the substrings must then be compared to determine the extent of the match in the parameters themselves. This can be accomplished by rewriting the parameters in one substring to match the parameters in the other until a conflict occurs. For example, if the matching substring is apbpcp . . . , (where "p" indicates a parameter) and the actual substrings are axbycy . . . and arbsct . . . ; then in the rewriting x becomes r and y becomes s, but then y cannot also become t. If such a conflict exists, then the match can be reported as shorter matches that exceed the predefined minimum. In the above example, the match of axby and arbs would be reported, then the analysis would be restarter with y becoming t.

As another example, the following two sequences of computer code are analyzed:

| Line | Seq1 | Seq2 | Comparison |
| --- | --- | --- | --- |
| 1 | x=y+z | x=a+b; | x → x; y → a; z → b |
| 2 | if (y>z) | if (b>c) | y → b; z → c |
| 3 | print ("yes"); | print ("no"); | "yes" → "no" |
| 4 | h=f(x); | h=f(x); | h → h; x → x |
| 5 | y=x; | c=x; | y → c; x → x |

A conflict exists in line 2 because y→a in line 1 and y→b in line 2. As such, a match can be reported of just one line. It is to be understood, however, that in practice a match less than a predetermined threshold would not be reported. The parameter analysis can be restarted on line 2, the line just after the conflicting parameter use. A second conflict is introduced on line 5, and a match can be reported for lines 2–4. Finally, a third match can be reported for line 5.

"PREV" FUNCTION

A problem with the parameterized matching process described above is that much computation time can be wasted in finding matches that are later discarded during parameter analysis. A solution in accordance with the present invention is to use a dynamic encoding process for chaining together occurrences of the same parameter within a string.

Figure 5:
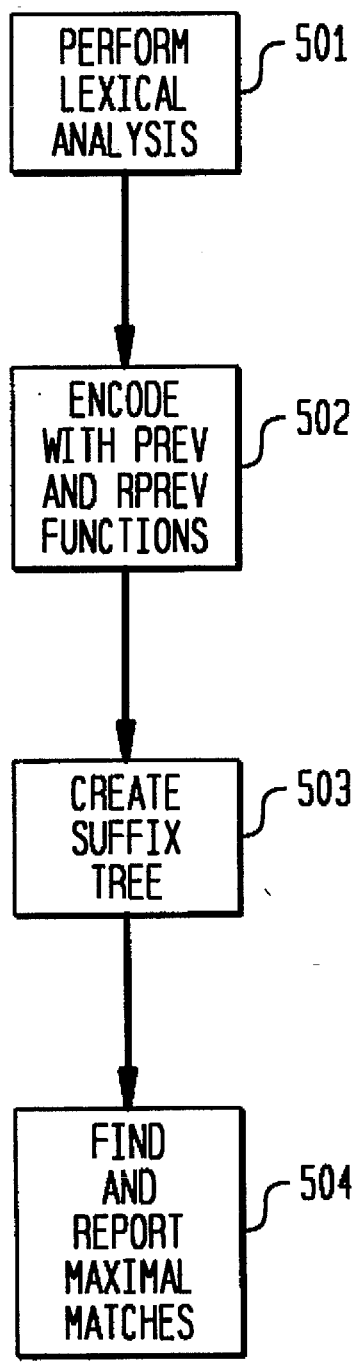
FIG. 5 illustrates a flow chart depicting a method of identifying maximal parameter matches in a parameter string encoded by the prev function.

FIG. 5 shows a preferred, more efficient process for finding matches in a parameterized string. First, the lexical analysis is performed as described above (step 501). Then, the resulting string is encoded with a "prev" function as described in further detail below to substitute integers for the parameters (step 502). A suffix tree is then constructed from the encoded string (step 503) and matching sequences are found by creating clists for the internal nodes in the suffix tree and using clists to find and report matches that exceed the desired threshold (step 504). Because of the use of the "prev" function, the matches found will be true matches and it is not necessary to analyze the parameters as in step 305. However, the steps of creating a suffix tree and finding matches are different for a string encoded with the prev function, as will be described below.

The prev function is a dynamic encoding scheme for chaining together occurrences of the same parameter within a p-string. For example, the prev function replaces the parameters in p-string S with integers as follows:

$$S=axaybxycby \quad prev(S)=a0a0b43cb3 \qquad (4)$$

The prev function establishes a relationship between each parameter in the p-string, other parameters of the same type and an initial reference position. In the preferred embodiment, the leftmost occurrence of a parameter is represented by a "0", and each successive occurrence is represented by an integer indicating the difference in position compared to the previous occurrence of the same parameter. Such integers are called parameter pointers. In the case of p-string S, each parameter pointer is represented by a single digit. However, in strings where occurrences of the same parameter are more widely separated in the string, multi-digit integers may be needed for pointers.

The suffixes for a p-string encoded with the prev function are also encoded with the prev function, the p-suffixes for prev(S) are illustrated below:

| a | 0 | a | 0 | b | 4 | 3 | c | b | 3 | $ |
| --- | --- | --- | --- | --- | --- | --- | --- | --- | --- | --- |
|   | 0 | a | 0 | b | 4 | 3 | c | b | 3 | $ |
|   |   | a | 0 | b | 0 | 3 | c | b | 3 | $ |
|   |   |   | 0 | b | 0 | 3 | c | b | 3 | $ |
|   |   |   |   | b | 0 | 0 | c | b | 3 | $ |
|   |   |   |   |   | 0 | 0 | c | b | 3 | $ |
|   |   |   |   |   |   | 0 | c | b | 3 | $ |
|   |   |   |   |   |   |   | c | b | 0 | $ |
|   |   |   |   |   |   |   |   | b | 0 | $ |
|   |   |   |   |   |   |   |   |   | 0 | $ |
|   |   |   |   |   |   |   |   |   |   | $ |

As can be seen, the number of p-suffixes associated with prev(S) are equal to the number of symbols in prev(S). The p-suffixes derived can then be represented by a parameterized suffix tree (p-suffix tree) as described hereinafter.

A suffix for a regular string can be determined from the string by reading the suffix from its beginning position in the string. Such procedure can also be used for a p-string encoded with the prev function except when a pointer is encountered. As can be seen from the above table of suffixes for prev(S), pointers change as the parameter positions to which they point are truncated. A "transform" function can be used to perform this change. Accordingly, "transform (b,j)" is defined as follows: If b is an integer greater than j−1, replace b with 0.

When used on pointers to determine a psuffix from a stored string prev(S), b is the pointer and j is the position of the pointer in the psuffix. Such function can also be used in a different manner for finding left contexts, as will be described below.

PARAMETERIZED SUFFIX TREE

Figure 6:
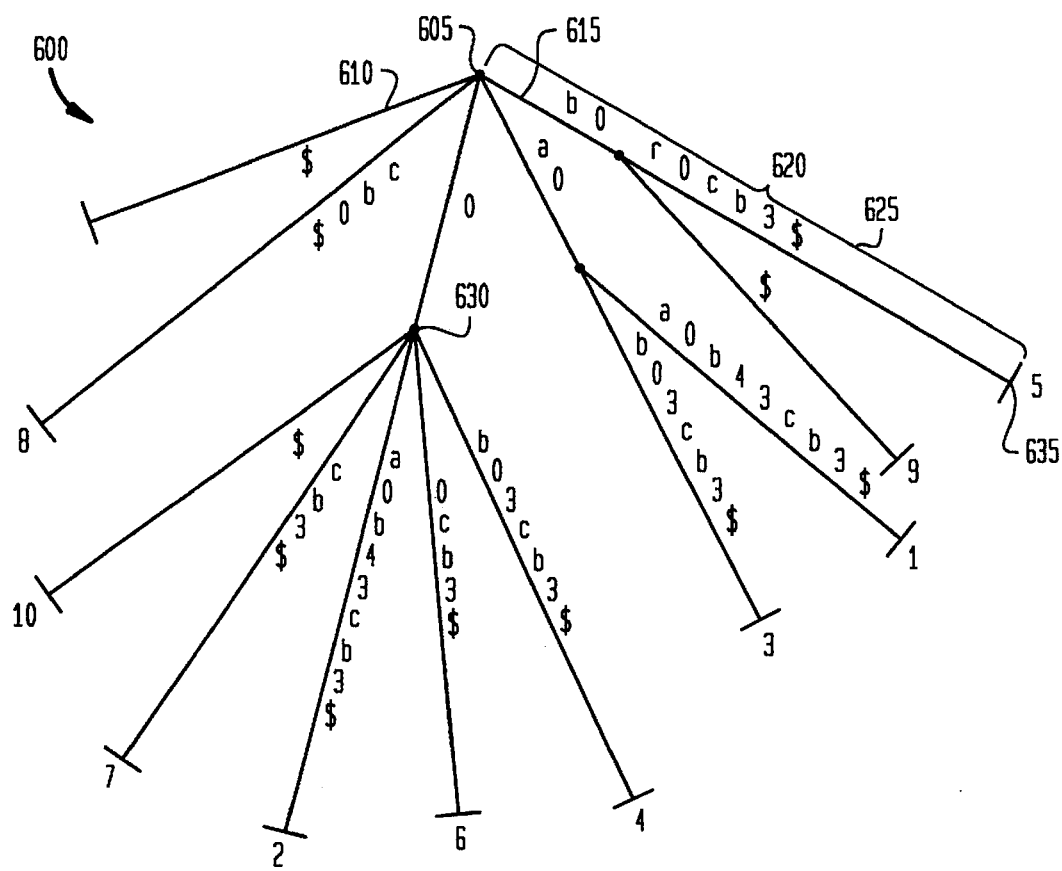
FIG. 6 illustrates a parameterized suffix tree of prev($S_1$) string in accordance with the present invention.

FIG. 6 illustrates a p-suffix tree 600 for the p-string S. The tree comprises a root 605 from which extends a plurality of arcs 610 which are each labeled with a non-empty substring of the input p-string S. For example, suffix b00cb3$ comprises a first arc 615 labeled by substring b0 and a second arc 620 labeled by substring 0cb3$. The combined substring comprising the first and second arcs is referred to as a path string 625. The path string formed by the sequence of arcs which originates at the root 605 and ends at a leaf node, 635 represents a single suffix. A prefix is the first part of a string or p-string, from the first symbol to symbol i, where $1 \leq i \leq n$ and n is the length of the string of p-string. For example, the label of the first arc 615 is a prefix of suffixes b0$ and b00cb3$.

Internal nodes 630 exist where there are common prefixes for different p-suffixes of the p-string. Each internal node 630 has at least two arcs extending therefrom, each beginning with a distinct symbol. Each node includes a pathstring which is a sequence of symbols existing in a path from the root to that particular node. The number of symbols within the pathstring is referred to as the pathlength. For each leaf, the pathstring is a distinct p-suffix. Therefore for a given p-string of length n, the number of leaves within the tree is n and the number of nodes in the tree is linear in n. The number of symbols in p-string S including the endmarker is 11. Referring to FIG. 6, it can be seen that the number of leaves in the p-suffix tree for p-string S is also 11.

CONSTRUCTING A P-SUFFIX TREE

Suffix links for a pstring encoded with the prev function need special consideration. The creation of a suffix tree involves inserting an internal node for each suffix added to the tree at the point where that suffix differs from suffixes previously in the tree. Thus, up to a given node, the suffixes depending from such node share a common portion and differ beyond the node.

Regular strings have two properties on which the ability to create suffix links depends, the common prefix property and the distinct right context property. The common prefix property is the property of two matching strings that the strings will still match if the first symbol of each string is removed. The distinct right context property is the property of two matching strings that if two strings differ because of the last symbol, the strings will still differ if the first symbol of each string is removed.

However, while strings encoded with the prev function follow the common prefix property, they do not follow the distinct right context property. The effect is that, in using the tree creation methods described above, the correct nodes may not always be created for suffix links to point to. In such a case, the suffix link for a node being created can be defined to point to a node in the tree having a pathstring as close as possible to that of the desired node.

Suffix links pointing to desired nodes can be marked as "good" suffix links and those pointing to close-by nodes can be marked as "bad" suffix links. Then, when a "bad" suffix link is used as a pointer, a rescanning step can be added to move up or down in the tree from the node indicated by the "bad" suffix link to find the exact position where the next node is to be created. When the node is actually created, the "bad" suffix link can then be updated to point to the correct node. In the preferred embodiment, each "bad" suffix link is defined to point to a node N in the tree beyond the desired node position and the rescanning step finds the correct position in the arc leading from node N to its parent.

IDENTIFYING MAXIMAL P-MATCHES OF A THRESHOLD LENGTH

Strings $S_1$ and $S_2$ are a p-match if prev($S_1$) is the same as prev($S_2$). For example, if $S_1$ is abxyaycx and $S_2$ is abzxaxcz, then prev($S_1$)=ab00a2c5=prev($S_2$). Here, x,y,z are parameters and a,b,c are non-parameters.

Now, suppose that $S_1$ and $S_2$ are a p-match and both are part of a longer p-string S. If $S_1$ starts at position i, $S_2$ starts at position j and $S_1$ and $S_2$ have length n, then S is said to have a p-match of length n starting at positions i and j. More succinctly, S may be said to have a p-match (i,j,n). For example, using $S_1$ and $S_2$ as defined in the last example, if S=bxabxyaycxczabzxaxczbca, then $S_1$ is the substring starting at position 3, $S_2$ is the substring starting at position 13, and S has a p-match (3,13,8).

It may be possible, however, that when S has a p-match (i,j,n), S may also have a p-match (i-1,j-1,n+1) if the p-strings of length n starting at positions i and j are a p-match; such a p-match is said to be left-extensible. In our example, S also has a p-match (2,12,9). Thus, the p-match (3,13,8) can be extended by one position to the left. The p-match (3,13,8) is thus left-extensible. Similarly, examples could be constructed of p-matches that can be extended by one position to the right; such p-matches are called right-extensible.

If a p-match can be extended to the left or right, it would be most useful not to report it separately, as the longer p-match will be reported as well. Therefore, it is useful to define maximal p-matches as those p-matches that are neither left-extensible nor right-extensible. The p-match (2,12,9) in the above example is maximal because it cannot be extended to the left (because position 1 contains a b while position 11 contains a c) and it cannot be extended to the right (because position 11 contains a c while position 21 contains a b).

Determining whether a p-match (i,j,k) of a p-string S is right-extensible is easily determined by comparing psuffix i and psuffix j: if they are the same for k+1 symbols, then the p-match is right-extensible, while if they differ at the (k+1)st symbol, the p-match is not right-extensible.

However, whether p-match (i,j,k) is left-extensible cannot be determined simply by comparing the symbols of S or prev(S) in positions i-1 and j-1 or even the first symbols of psuffix i-1 and j-1. The reason is that the value of a parameter pointer depends on preceding context.

For example, if two p-suffixes have a common header, a "0" in the header could mean different things in each p-suffix. In one p-suffix, the "0" could have replaced a pointer to the symbol immediately preceding the p-suffix; in the other it could have replaced a pointer to an earlier symbol in the p-string.

One way to identify left extensibility is to construct another string rprev(S), which is similar to prev(S) except that the pointers are determined in the reverse direction. For example:

S=axaybxycby$ prev(S)=a0a0b43cb3$ rprev(S)=a4a3b03cb0$

The string rprev(S) is then used when finding a left context to determine left-extensibility.

In finding a left context in a p-string encoded with rprev(S), the "transform (b,j)" function described above is needed to modify pointers. In this use of the transform, b is the pointer being modified and j=n+1, where n is the pathlength of the node for which the left context is being determined. Thus, the left context of a p-suffix with respect to a particular node can be found.

As an example, suppose that a node N has children N1, N2 ... Nk, from left to right, and pathlength n. If two leaves corresponding to psuffixes m and t, respectively, are taken from the subtrees of Ni and Nj, where i=j, then (m,t,n) is a p-match that is not right-extensible, since psuffixes m and t agree for n symbols, and then disagree at the (n+1)st symbol. If the transformed left contexts for psuffixes m and t are also different, i.e. the symbols of rprev(S) at positions m−1 and t−1 are different, then the p-match is not left-extensible, and the p-match is maximal. For example, consider FIG. 6, which illustrates the p-suffix tree for prev(S)=a0a0b43cb3$, for which rprev=a4a3b03cb0$. There is a p-match (6,7,1) which corresponds to a pathstring of a single symbol 0 in the p-suffix tree for node 630 in the tree; this p-match is not right-extensible because the leaf for psuffix 6 is reached through the arc of node 630 whose label begins with 0, while the leaf for psuffix 7 is reached through the arc whose label begins with c. This p-match is not left-extensible because the 5th symbol of rprev(S) is b while the 6th symbol is 0, and transform(0,2)=0.

Plists and clists can thus be generated for "prev(S)" strings using a method similar to that described above for regular strings, but with the "rprev(S)" string and "transform (b,j)" function being used in finding left contexts and other modifications as will now be described.

In general, the method classifies the leaves in the subtree subtree rooted at each child of a node N according to the left context transformed with respect to N. For example, if leaf L1 is for psuffix 3 with transformed left context 0, leaf L2 is for psuffix 10 with transformed left context b, and leaf L3 is for psuffix 7 with transformed left context 0, L1 and L3 would be grouped under 0 and L2 would be under b. Thus, there would be one plist 0:3,7 and another plist b:10.

Thus, a method for finding all maximal p-matches is to do the following for each node N: find all leaves L1 and L2 corresponding to psuffixes r and s, respectively, such that the transformed left context (with respect to N) of r and s are different and L1 and L2 belong to the subtrees of different children of N, and for each such pair of leaves, report a p-match (r,s,n), where n is the pathlength of N. This can be accomplished by doing the following for each N: sort the leaves of each subtree rooted at a child of N into plists, where each plist corresponds to a distinct transformed left context with respect to N, and then for all pairs Ni and Nj, with i≦j, consider all pairs of plists Bi and Bj where Bi is a plist for Ni and Bj is a plist for Nj, and for each such Bi and Bj that correspond to different transformed left contexts with respect to N, and each m in Bi and each t in Bj, report a maximal p-match (m,t,n).

Because a leaf rooted at a child node Ni may have a transformed left context that is nonzero at Ni but zero at its parent node N, the entry for such a leaf can appear in different plists in Ni and N. Thus, leaves represented in separate plists with different nonzero integers as left contexts in node Ni can be represented in the plist with "0" as left context in node N. An example is a left context that is "3" when evaluated as transform (3,4) at a node of pathlength 3 but "0" when evaluated as transform (3,3) at a node of pathlength 2. Thus, for prev(S) strings, when the clists are processed at a node, the left contexts are always determined with respect to the pathlength of the node so that the pointers will be correct.

It is not necessary to create clists for nodes having pathlengths less than the minimum match desired, as such clists will not be used.

PATTERN MATCHING

The present invention is also directed to a method of finding all occurrences of a pattern P in a text string T by means of a suffix tree for P augmented with suffix links. The basic idea for strings is to follow the path determined by symbols of T through the tree, starting at the root and the first symbol of T. Whenever the next symbol of T is not available in the tree, follow the suffix link from the last node reached, rescan downward using arc lengths to catch up to the last symbol of T already matched, and continue following the path downward determined by symbols of T. Whenever the current position in the tree corresponds to matching the last symbol of P before the endmarker, a match is reported.

In the ith stage, $1 \leq i \leq T$, A comparison is made between the ith p-suffix of T and the p-suffixes of S. For i=1, the N-root, and len−1 are initialized; in general, at the start of a stage, N represents the node to begin searching from, and len represents the pathlength corresponding to the next text symbol that needs matching. In Stage i, this will be symbol $T_{i+len-1}$; the pathstring prev($T_i \ldots T_{i+len-2}$) terminates either on the arc from parent(N) to N or below N. In the latter case, rescanning of $T_i \ldots T_{i+len-2}$ by comparing the first symbols of arcs to the text symbols (transformed by f) is used to get to a point in the tree corresponding to pathstring prev($T_i \ldots T_{i+len-2}$) and pathlength len−1. Starting with j=len, the algorithm tries for successive values of j to match the transformed jth symbol of the ith p-suffix to T to a symbol at pathlength j in the tree; the transformed jth symbol is f(prev(T)[i+j−1],). Thus, a path is followed downward in the tree, matching transformed input symbols agains symbols in the pathstring. If it passes through the symbol corresponding to the last symbol of P (not counting the endmarker), a p-match is reported. When the jth symbol of the ith p-suffix of T is not available in the tree, no longer prefix of this p-suffix matches any prefix of a p-suffix of P. In this case, if a node at pathlength j−1 is reached it is referred to as $\overline{N}$; otherwise let $\overline{N}$ be the parent of the node reached by the arc currently being examined. Set N=SL($\overline{N}$) and increment i; if j−1, set len=j, and otherwise, set len=j−1.

Another way to find occurrences of string P in string T is to append P to T and search for matches by using clists as described above. Each match of P found in T will then be reported.

Figure 7:
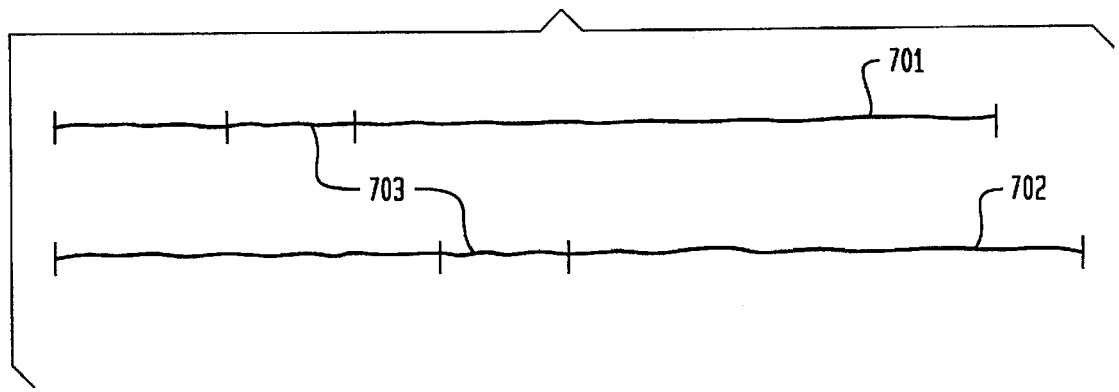
FIG. 7 shows two strings of text to be compared for common text.

Two strings of comparable length can be compared by concatenating the two strings and then searching for matches in the combined string by using clists. It may be desirable to eliminate duplicate substrings in each string first before concatenation to minimize the length of the combined string. For example, in FIG. 7, two text strings 701 and 702 are represented. Text portion 703 is present in both strings 701 and 702. If strings 701 and 702 are concatenated to form one long string and a search made for matches, the duplication of text portion 703 will be reported. This method can be used, for example, in finding plagiarized text by concatenating a suspected text onto the text believed to be plagiarized. Clearly, all these procedures for finding occurrences of one string in another and comparing strings can be performed for parameterized strings by using the methods of the invention described above.

LINEAR STRINGS FOR SQUARE MATRICES (LSTRINGS)

Referring to FIG. 8, there is shown a n×n matrix 800 which is denoted by $A[1:n, 1:n]$. A jth suffix 805 of matrix A is defined for $1 \leq j \leq n$, as $A[j:n, j:n]$ and a jth prefix 810 of matrix A is defined as $A[1:j, 1:j]$. Any square submatrix S 815 whose upper left corner lies on the main diagonal 820 of A is defined to be a prefix of a suffix of A. Each diagonal of A is numbered by d if its elements are $A[i, j]$ with $i-j=d$ and $0 \leq d \leq n-1$.

Figure 9A:
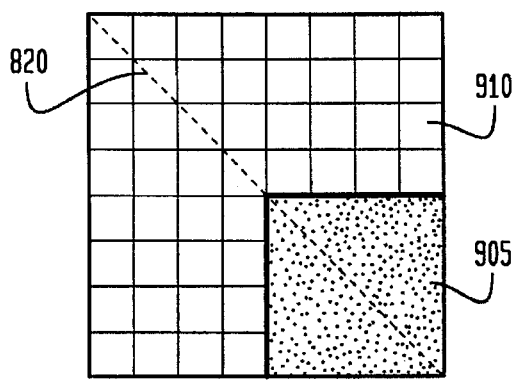
FIGS. 9a–9d illustrate various prefixes and suffixes of the matrix A of FIG. 6.
Figure 9B:
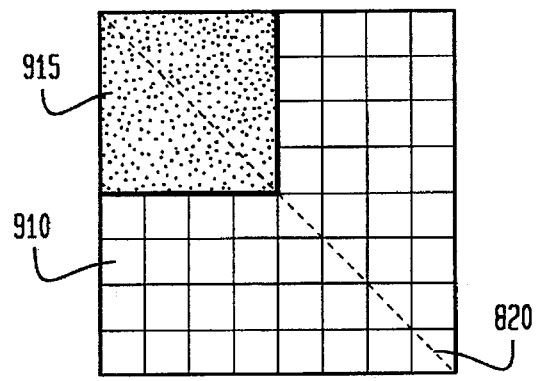
Figure 9C:
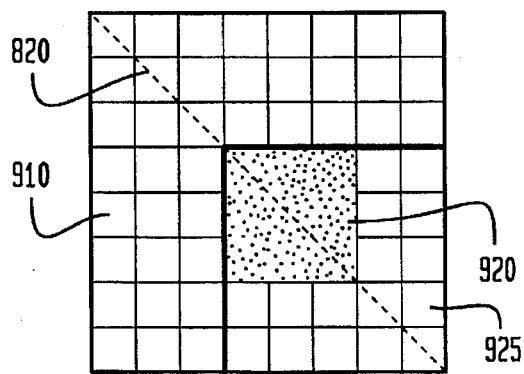

FIGS. 9a–9d illustrate various prefixes and suffixes of matrix A. FIG. 9a illustrates a 5th suffix 905 of A. In general, an ith suffix of A is identified by the subsquare 910 of the main diagonal 820 at which the suffix begins. FIG. 9b illustrates a 4th prefix 915 of matrix A. In general, an ith prefix of a matrix is determined by figuring out how many subsquares 910 of the main diagonal 820 are occupied by the prefix. Combining these two principles FIG. 9c illustrates a 3rd prefix 920 of a 4th suffix 925 of matrix A. As can be seen, the suffix 925 begins at the fourth subsquare 910 of the diagonal 820 and the prefix 920 encompasses the first three subsquares 910 of the main diagonal 820 contained within the suffix 925.

Figure 9D:
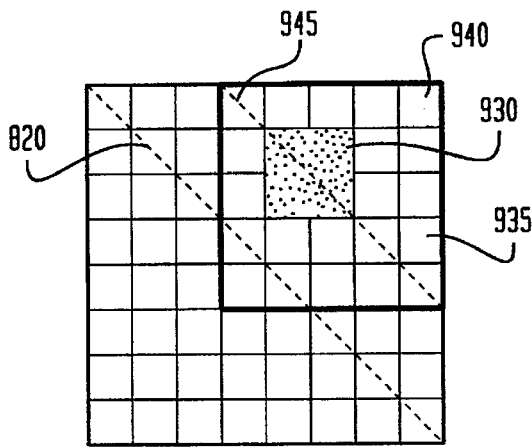

Likewise, prefixes and suffixes of submatrices not located on the main diagonal can also be represented in this manner. FIG. 9d illustrates the second prefix 930 of the second suffix 935 of submatrix $A_{-3}$ 940. The notation $A_{-3}$ indicates that the left upper corner of the submatrix is located at the third main diagonal relative to the main diagonal 820. The prefix and suffix notation of the submatrix is analogous to that of the main matrix A but refers to the positional relationship with respect to the main diagonal $d_{-3}$ 945 within the submatrix.

Figure 10A:
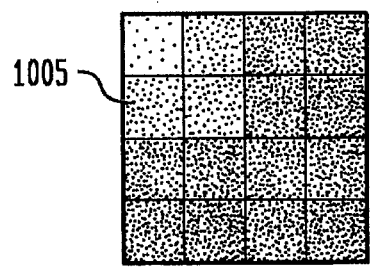
FIGS. 10a–10d illustrate the matrix A of FIG. 6 divided into L-shapes characters and an L-string for the matrix derived from the L-shaped characters.
Figure 10B:
Figure 10C:
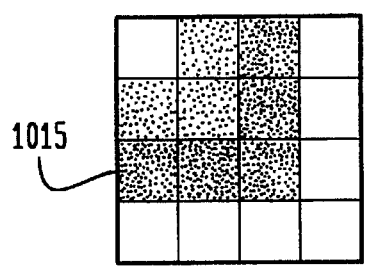
Figure 10D:

Referring to FIGS. 10a–10d, the matrix A can be converted to a linear representation which is referred to as a linear string (Lstring). Referring to FIG. 10a, the matrix $A[1:n, 1:n]$ is divided into n L-shaped characters 1005 from an alphabet of L-shaped characters, $L\Sigma$, the ith L-shaped character comprising row $A[i, 1:i-1]$ and column $A[1:i, i]$. Referring to FIG. 10b, the L-shaped characters 1005 can further be represented in one dimension in an L string 1010 by arranging the L-shaped characters 1005 in an order determined by their top-down appearance in A. Two L-shaped characters are equal if the Lcharacters 1005 are equal as strings over the alphabet $\Sigma$. Two Lcharacters can be concatenated by concatenating the strings corresponding to each Lcharacter. Referring to FIG. 10c, a series of Lcharacters 1005 which are concatenated are referred to as chunks 1015 which are obtained by labeling the L-shaped characters 1005 of A in one dimension in the order given by their top-down appearance in A, starting at row k and ending at row j. While an Lstring 1010 represents an entire matrix, a chunk 1015 represents a given portion of a matrix. However, an Lstring 1010 can also be used to represent a chunk 1015 as illustrated in FIG. 10d. FIG. 10d illustrates an Lstring 1020 for the chunk 1015 illustrated in FIG. 10c.

LINEAR SUFFIX TREES (L-SUFFIX TREES)

An L-suffix tree is constructed so that given a square matrix $A[1:n, 1:n]$, a path is provided within the tree which corresponds to each square submatrix of A. Each square submatrix of A is established by determining the suffixes of matrix A. Square submatrices of A having common prefixes share the same path on the tree. In addition, each submatrix of A must be a prefix to some suffix of A so that a correspondence can be realized between all submatrices of A and the paths of the tree by considering only the suffixes of A.

Each matrix which is to be represented in the tree is transformed to a linear representation of Lcharacters as discussed above. The Lcharacters are further broken down to a set of Lsuffixes which represent the matrix. Preferably the bottom row and rightmost column of the matrix is augmented with the symbol $ so that each row and column of the matrix end with a unique endmarker.

Figures 11A, 11B:
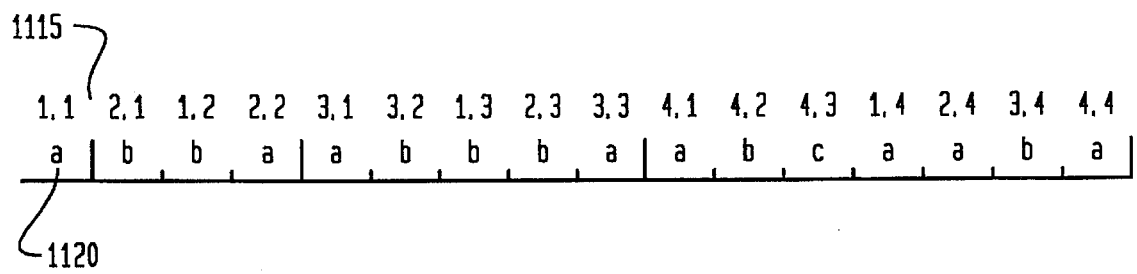
FIGS. 11a and 11b illustrate a matrix containing unique endmarkers and an L-string representation of the matrix.

Referring to FIG. 11a, there is shown a matrix 1100 which includes a bottom row 1105 and rightmost column 1110 which contains a unique endmarker. The numbers on top of the first row and adjacent the first column represent the positional relationship of each square within the matrix. FIG. 11b illustrates an Lstring 1115 for the matrix 1100 illustrated in FIG. 11a. Above each symbol 1120 in the Lstring 1115 is the positional notation corresponding to the symbol's position within the matrix 1100.

An Lsuffix tree $LT_a$ is constructed by inserting each Lsuffix of a matrix A from the longest suffix to the shortest suffix into a tree of initially one node referred to as the root. As each Lsuffix is added to the tree, internal nodes are created based on common Lprefixes between two or more of the Lsuffixes. Each internal node within the tree must have at least two offspring. Edges connecting the nodes are labeled by Lcharacters or chunks. Chunks or Lcharacters which are assigned to offspring edges start with different Lcharacters which are of the same length as strings in $\Sigma^*$. The concatenation of the chunks labeling the edges on a path from the mot to a leaf provides one Lsuffix of the matrix. As such, there is a one to one correspondence between the leaves of the tree $LT_a$ and the Lsuffixes of the matrix A.

Figure 12:
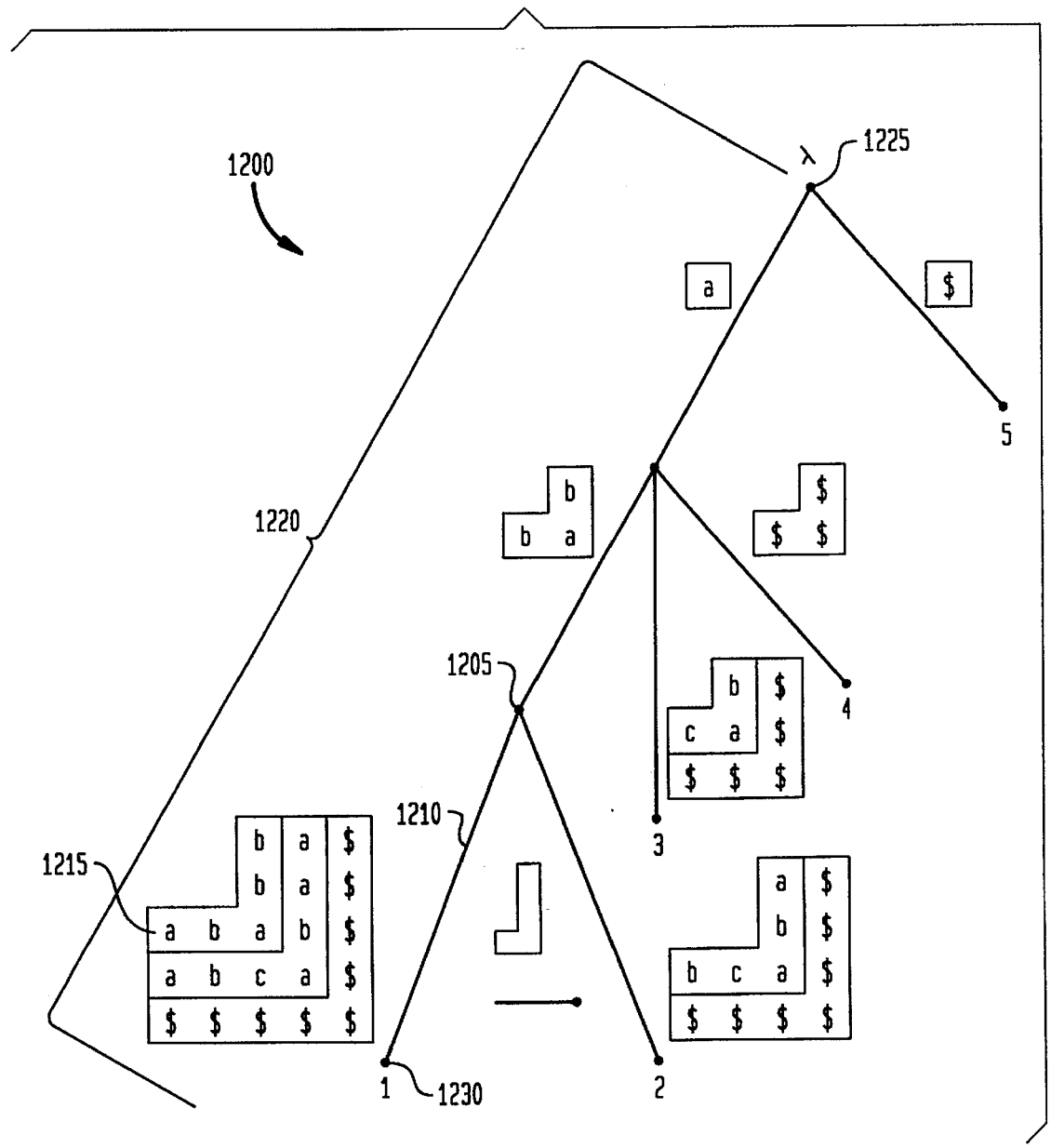

Referring to FIG. 12, there is shown an Lsuffix tree 1200 for the matrix in FIG. 11a. Each internal node 1205 within the tree 1200 contains at least two offspring 1210 which are labeled by chunks 1215. Each Lsuffix 1220 is represented by the concatenation of labels from a root 1225 of the tree 1200 to each leaf 1230.

A node u is defined to be a locus of an Lstring ($L\alpha$) within the Lsuffix tree LT if the concatenation of the labels on the path from the root of LT to u is equal to $L\alpha$. An extension of $L\alpha$ is defined to be any Lstring of which $L\alpha$ is an Lprefix. An extended locus of $L\alpha$ is defined to be a locus of the shortest extension of $L\alpha$ whose locus is defined in LT. A contracted locus of $L\alpha$ is defined to be a locus of the longest Lprefix of $L\alpha$ whose locus is defined in LT.

CONSTRUCTING AN LSUFFIX TREE

An Lsuffix tree $LT_i$ is a compacted trie over the alphabet $L\Sigma$ that represents the suffixes $A[j:n+1, j:n+1]$ for $1 \leq j \leq i$ of matrix A as Lstrings. For each stage i an L suffix is added to the tree $LT_{i-1}$ thereby producing tree $LT_i$. An Lstring corresponding to a longest prefix of $A[i:n+1, i:n+1]$ that is also a prefix of $A[j:n+1, j:n+1]$ is referred to as $Lhead_i$. Because $Lhead_i$ occurs at least once in the Lsuffix tree LT, it must have a locus defined in $LT_i$. However, $Lhead_i$ may not have a locus defined in the Lsuffix tree $LT_{i-1}$. Each L string which is inserted in the tree $LT_{i-1}$, shares a path with an existing path within the tree i.e., a common L prefix with another L suffix, until there is an uncommon symbol. At that point, a node is inserted and a new leaf is attached to the node which is labeled by the L suffix thereby producing tree $LT_i$.

As discussed above, square matrices do not follow the Distinct Right Context property for strings. As such, suffix links cannot be defined in the Lsuffix tree in the ordinary manner. FIG. 11 illustrates a procedure for defining a suffix link in the L suffix tree. In order to define suffix links for an Lsuffix tree the locus of $Lhead_{i-1}$ is defined as $v \in LT_{i-1}$ and the locus of $Lsuffix_{i-1}$ is defined as $g \in LT_{i-1}$. Suffix links for all of the leaves of $LT_{i-1}$ with the exception of g can now be defined. For each leaf $q \in LT_{i-1}$ and q not equal to g, the locus of the Lstring corresponding to $A[j:n+1, j:n+1]$, i.e., Lsuffix j for $j \leq i-1$, there is a suffix link pointing to leaf w, where w is the locus of the Lstring corresponding to $A[j+1:n+1, j+1:n+1]$, i.e., $Lsuffix_{j+1}$. The suffix link for leaf q is denoted by $SL(q)=w$.

When $Lhead_i$ has a locus defined in $LT_{i-1}$, it is identified so that a leaf offspring can be created for that locus. If $Lhead_i$ does not have a locus defined in $LT_{i-1}$, the node is created as an offspring of the contracted locus of $Lhead_i$ in the tree. The Lstring, $L\alpha$ is defined as corresponding to $A[i:i+h-1, i:i+h-1]$, where $h=\min(0, 1_{i-1}, -1)$. $L\alpha$ is the Lprefix of $Lhead_i$ and has an extended locus r' in $LT_{i-1}$. The extended locus r' is an ancestor of any leaf $u=SL(q)$, where q is not equal to g is any leaf descendant of v. The contracted locus u of $L\alpha$ in $LT_{i-1}$ is the parent of r', when $L\alpha$ does not have a locus defined in $LT_{i-1}$.

To find the contracted locus of u of $L\alpha$, a rescanning procedure is used in which the node u is first identified from which the search is initiated. In order to find the contracted locus u of $L\alpha$ in the tree $LT_{i-1}$ the procedure findlocus is followed. It is assumed that the v is not equal to $root(LT_{i-1})$, i.e., the locus of $Lhead_{i-1}$ in $LT_{i-1}$. The findlocus procedure begins by selecting any offspring c of v which is not equal to the leaf g. The leaf q of the tree $LT_{i-1}$ is pointed to by c. On the path from the root of $LT_{i-1}$ to $SL(q)$, u is the deepest node such that $1(u) \leq h$, where $1(u)$ is the length of the Lstring where u is the locus and $h=\min(0, 1_{i-1}, -1)$.

Once node u is identified, the contracted locus of $Lhead_i$ can be located by using a scanning procedure referred to as findpath. If the contracted locus u of $L\alpha$ is root ($LT_{i-1}$), the findlocus procedure is skipped and the findpath procedure is initiated to find the contracted focus of $Lhead_i$. In findpath, the only offspring r of node u is selected so that the first Lcharacter of the chunk on the edge (u,r) is $A[i+1(u), 1:i+1(u)-1] A[1:i+1(u), i+1(u))]$, i.e., the Lcharacter equal to $Lsuffix[1(u)+1]$. If no such offspring exists, the locus of $Lhead_i$ is equal to the extended locus of $Lhead_i$ in $LT_{i-1}$. If the offspring r exists, the extended locus of $Lhead_i$ in $1LTi-1$ (f) must be located. The findpath procedure skips the first $h-1(u)$ Lcharacters of the chunk on the edge (u,r), i.e., they are not compared against the corresponding Lcharacters of the Lstring obtained from $A[i:n+1, i:n+1]$. This essentially results in the skipping of the matrix corresponding to Lalpha. The findpath procedure compares one by one and from left to right, the remaining (skipping $L\alpha$) Lcharacters of $A[i:n+1, i:n+1]$ with the corresponding ones on the edge of the path from u to f. The findpath procedure continues the comparison until a difference in characters is detected. That identifier is the contracted locus of $Lhead_i$.

Once the contracted locus of $Lhead_i$ or the locus $Lhead_i$ is located, an updatetree procedure is initiated which transforms the tree $LT_{i-1}$ into $LT_i$. If the locus of $Lhead_i$ in $LT_{i-1}$ (w) is identified, a leaf g' is created as an offspring of the locus. The edge (w,g') is labeled with a triple $(1(w)+1, n+1, i)$ that corresponds to the chunk obtained by deleting $Lhead_i$ from the $Lsuffix_i$.

If w is the contracted locus of $Lhead_i$ in $LT_{i-1}$, a new node w' is created as the locus of $Lhead_i$ by splitting an edge (w,f), i.e., w' is made an offspring of w. The edge (w,f) is labeled by $(p_1, p_2, j)$. The label on the edge (w, w') is set to $(p_1, p_1+1_f-1(w)-1, j)$ and the one on the edge (w',f) to $(p_1+1_f-1(w)-1, p_2, j)$. The concatenation of the Lstring of which w is the locus with the first $1_f-1(w)$ Lcharacters of the chunk of the edge (w,f) is equal to $Lhead_i$. Furthermore, the concatenation of the chunks on the edges (w,w') and (w',f) gives the chunk on the former edge (w,f).

STATISTICAL ANALYSIS USING LSUFFIX TREES

An Lsuffix tree can be used to answer statistical queries about the structure of a TEXT matrix. An Lsuffix tree is constructed for the TEXT matrix as described above. From the TEXT matrix, queries can be answered such as determining the largest square matrix that appears in position $A[i,j]$ of TEXT, or if given two pattern square matrices of TEXT, determining the longest prefix the pattern matrices have in common. The Lsuffix tree can also be used to determine the number of occurrences a particular submatrix of TEXT occurs in the TEXT matrix. The procedures for answering these statistical queries are the same procedures used to construct the Lsuffix tree, i.e., the findlocus and findpath procedures.

The procedure used to find $Lh_{i,d}$ is similar to that for finding $Lhead_i$. The procedure first looks for input v which is the extended locus of $Lh_{i-1,d}$. If $v=root(LT)$ then locus $u=root(LT)$ and the rescanning procedure findlocus as discussed above is skipped. If v is not equal to $root(LT)$, the rescanning procedure is used to locate the contracted locus u of $L\gamma$. Once the contracted locus u is identified, a scanning procedure is performed which starts at u and skips $L\gamma$ to find the extended locus of $Lh_{i,d}$.

REFINING THE LSUFFIX TREE

In some cases, the Lsuffix tree may need to be refined so that more intricate searching can be accomplished. As such, a refined Lsuffix tree $RLT_D$ as shown in FIG. 12 can be constructed which represents the same information as in the Lsuffix tree $LT_D$ but in a different format. For a given internal node $v \in LT_D$, the number of offsprings of v is represented by off(v) which are then sorted by the first Lcharacter of the chunks on the corresponding edges and listed by the notation $w_1 < \ldots < w_{off(v)}$. A string which corresponds to the chunk on the edge $(v, w_i)$ where $1 < i < off(v)$ is referred to as $\beta_i$. For each internal node $v \in LT_D$ a contracted trie $PT(v)$ is built which is defined over $\Sigma$ which represents as strings in $\Sigma$, the chunks on the edges outgoing from v, i.e., $\beta_i \ldots \beta_{off(v)}$. Therefore, each edge of $PT(v)$ has a string assigned to it which is a substring of some $\beta_i$. The mot of $PT(v)$ corresponds to v. The tries are attached based on the parent-offspring relation in $LT_D$, i.e., for each edge $(v,f) \in LT_D$, the root of $PT(f)$ is coalesced with the leaf corresponding to it in $PT(v)$ which results in the tree $RLT_D$.

PATTERN RETRIEVAL USING THE REFINED LSUFFIX TREE

Pattern retrieval can be used to preprocess a TEXT matrix to build an index data structure that represents all substrings of the text. In addition, the data structure can be used to report all occurrences of a pattern matrix PAT in the TEXT matrix. Pattern retrieval can also be used for statistical queries regarding the structure of the text, e.g., finding the longest repeated substring of the text.

Prior to beginning the pattern retrieval procedure, an Lsuffix tree LTD is constructed for the TEXT matrix and refined in the manner described above. An Lstring Lpat is created to represent the matrix PAT. Lpat occurs in the matrix TEXT if Lpat has an extended locus in tree RLTD. The pattern retrieval procedure essentially identifies the set of suffixes within the TEXT matrix that include the PAT matrix as a prefix.

The foregoing merely illustrates the principles of the invention and it will thus be appreciated that those skilled in the art will be able to devise numerous alternative arrangements which, although not explicitly described herein, embody the principles of the invention and are within the scope and spirit.

We claim:

1. A computer implemented method of finding maximal matches in a data string comprising the steps of:

creating a suffix tree representing the data string;

for each internal node in said suffix tree, generating a list having an entry for each suffix associated with said node, each entry indicating (i) the position of the start of its associated suffix in said data string and (ii) the left context relative to the position, each node having a pathlength indicating the number of symbols between the root of said suffix tree and said node;

recognizing matches having the length of the pathlength of said node for each pair of entries having different left context;

generating a list of said matches; and reporting said list of matches.

2. The method of claim 1 in which said reporting step further comprises:

reporting only those matches having lengths greater than a predetermined threshold.

3. The method of claim 1 in which said data string contains symbols from at least two alphabets, further comprising the steps of:

before said creating step substituting a common symbol for all symbols from one of said alphabets;

after said recognizing step, for each match, comparing the original symbols for which said common symbol was substituted in said substituting step to determine whether said original symbols are consistent and discarding said matches in which symbols are not consistent.

4. The method of claim 1 in which said data string contains symbols from at least two alphabets, further comprising the step of:

before said creating step, substituting an integer for all symbols from one of said alphabets, each said integer for a given symbol being chosen to point to an adjacent instance of said symbol in said data string, whereby said integers form linked lists of the symbols for which said integers were substituted.

5. The method of claim 1, wherein the data string comprises a square text matrix, and wherein the step of creating a suffix tree comprises the steps of:

dividing the square text matrix into Lcharacters;

concatenating said Lcharacters to form an Lstring; and constructing an Lsuffix tree from said Lstring.

6. A computer implemented method of locating duplications within a text, the method comprising the steps of:

dynamically encoding one or more characters of said text in a manner in which like parameters contained within a string are labelled to identify their positional relationships within the string;

creating a modified suffix tree from said encoded data;

applying said modified suffix tree to identify duplications in said text, said duplications representing identical or approximate matches of said text prior to its encoding, wherein said duplications are of at least a threshold length; and reporting said identified duplications in said text.

7. The method of claim 6 wherein said encoded text is a square matrix which is divided into Lcharacters from which is created an Lstring.

8. The method according to claim 6 wherein said step of creating a modified suffix tree further comprises the steps of:

establishing a root for the tree, attaching arcs to the mot for each suffix of the encoded text to the string such that suffixes having common prefixes extend from the same arc, and defining suffix links within the tree for traversing the tree in an efficient manner.

* * * * *